No. 12,683. REISSUED AUG. 27, 1907.
T. L. & T. J. STURTEVANT.
VEHICLE BRAKE.
APPLICATION FILED APR. 27, 1907.
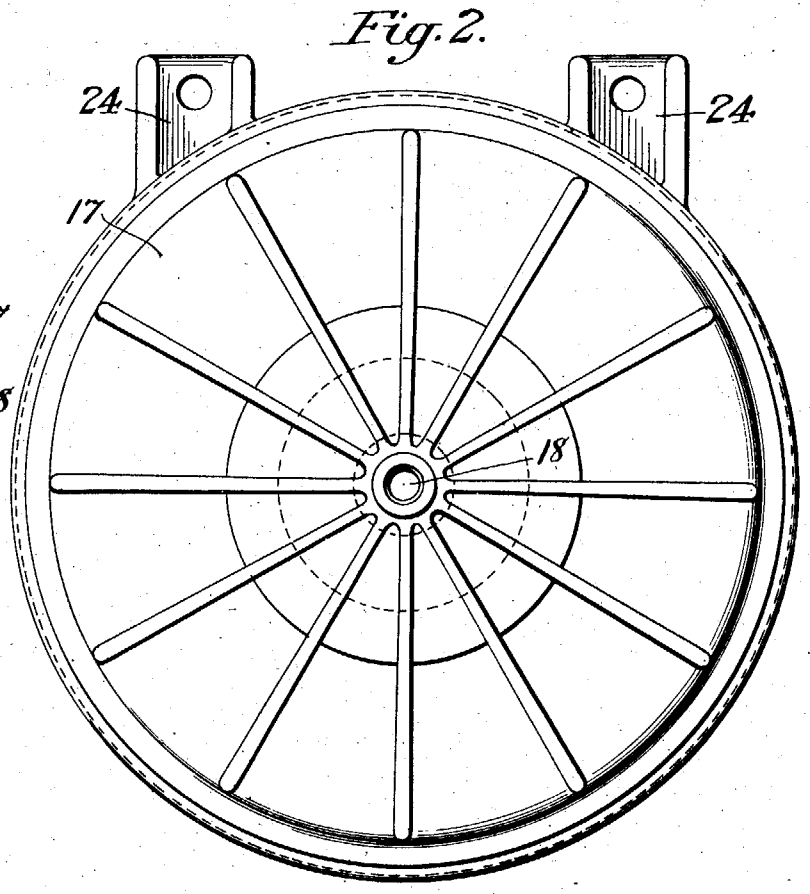
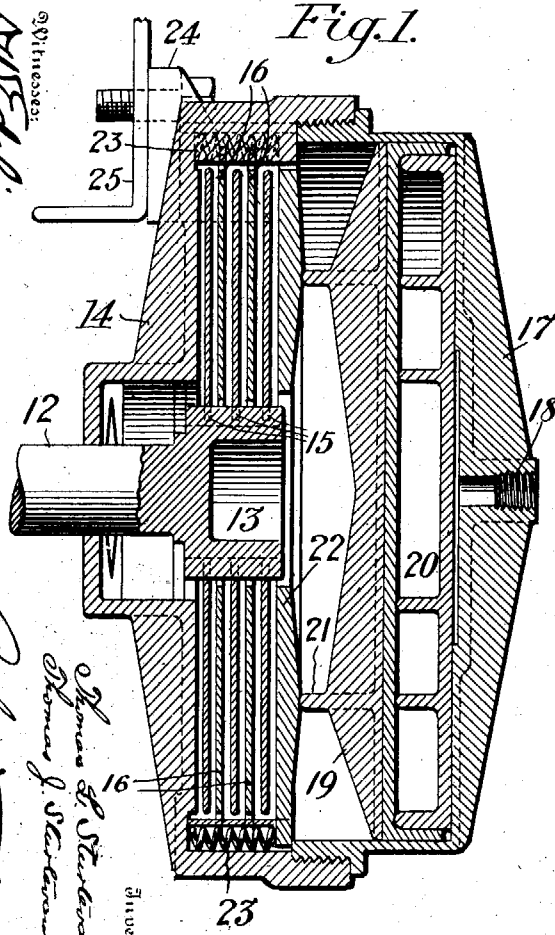
Witnesses:
D. W. Edelin.
C. M. Sweeney
Inventors:
Thomas L. Sturtevant,
Thomas J. Sturtevant,
By Calvin Tabor,
Attorneys.

UNITED STATES PATENT OFFICE.

THOMAS LEGGETT STURTEVANT, OF QUINCY, AND THOMAS JOSEPH STURTEVANT, OF WELLESLEY, MASSACHUSETTS, ASSIGNORS TO STURTEVANT MILL COMPANY, OF PORTLAND, MAINE, A CORPORATION OF MAINE.

VEHICLE-BRAKE.

No. 12,683. Specification of Reissued Letters Patent. Reissued Aug. 27, 1907.

Original No. 799,690, dated September 19, 1905, Serial No. 240,424. Application for reissue filed April 27, 1907. Serial No. 370,729.

*To all whom it may concern:*

Be it known that we, THOMAS LEGGETT STURTEVANT, residing at Quincy, and THOMAS JOSEPH STURTEVANT, residing at Wellesley, in the county of Norfolk and State of Massachusetts, citizens of the United States, have invented certain new and useful Improvements in Vehicle-Brakes, of which the following is a specification, reference being had therein to the accompanying drawings.

This invention has for its object to provide a brake which is more especially adapted for use with motor-vehicles, but which may be used for other purposes where it is desirable to check or stop the rotation of a driven shaft or wheel.

To this end the invention comprises a series of disks or flat rings which will normally be held out of frictional contact with each other, a portion of these disks or rings having at their inner edges internotched or other suitable engagements with a hub on a rotating shaft or wheel and the alternating disks or rings having at their peripheral portions similar engagements with a stationary inclosing casing. These friction disks or rings are normally held out of gripping frictional engagement with each other by suitable springs, and when it is desired to set the brake into action the said friction disks or rings are preferably forced into gripping frictional engagement with each other by means of a piston working in a suitable cylinder and acting on a master-plate against which the springs referred to impinge, the said piston being operated by any suitable fluid-pressure, preferably air, derived from a suitable air-pump or storage-tank, and means being provided whereby a fluid-pressure may be exerted in the cylinder when the brake is to be set into action.

In the accompanying drawings, Figure 1 is a sectional view of an apparatus embodying the present invention, and Fig. 2 is an elevation looking from the right of Fig. 1.

Referring to the drawings, 12 denotes a driven shaft, which may be the motor-shaft of an automobile or other vehicle and which is provided with a hub 13. A suitable stationary casing 14 incloses a series comprising two sets of disks or rings 15, 16, the disks or rings 15 having at their inner edges suitable internotched engagements with the hub 13 and the alternating disks or rings 16 having at their peripheries similar notched engagements with said casing 14.

Attached to the casing 14 is a pressure-cylinder 17, provided with an inlet or port 18, and within said cylinder is a piston 19, preferably provided with a leather packing 20 and having lugs or projections 21, which bear against a master-plate 22 within the casing 14, said master-plate being normally pressed toward the said piston by springs 23 within the said casing 14. The said springs thus serve to relieve the clutch-rings or disks from pressure when pressure in the cylinder 17 is relieved.

The casing 14, within which the friction disks or rings are inclosed, is preferably made oil-tight, so that said disks or rings may run in oil, and thus be suitably lubricated in such a manner that there will be no appreciable wear thereon and so that no dirt or dust can gain access to their surfaces, and thus the conditions under which they will operate will therefore be just alike and no adjustments will be necessary for the purpose of compensating for wear. In the construction herein shown, and in which the pressure-cylinder is screwed to the said casing 14, a single oil-tight chamber is provided to contain the disks or rings 15 and 16 and the piston 19, so that all of these parts may be suitably lubricated. The casing 14 is provided with ears or lugs 24 for attachment to any suitable part of a vehicle-frame, as by hangers 25 on or forming part of such frame.

The operation of the invention is as follows: When the driven shaft 12 is running the disks or rings will be out of gripping frictional contact with each other owing to the stress of the springs 23, which force the master-plate 22 away from the said disks or rings when pressure in the cylinder 17 is relieved. When it is desired to check or arrest the movement of the shaft 12, air or other fluid under pressure will be admitted to the pressure-cylinder 17, thus moving the piston 19 inward toward the friction disks or rings in such a manner as to overcome the stress of the springs 23, and thereby force the said disks or rings into gripping frictional contact with each other so as to exert a drag upon the said shaft 12 and which drag will correspond to the amount of pressure applied in the pressure-cylinder, and which may be of any desired degree or amount so as to check or entirely arrest the motion of such shaft, as circumstances may require.

It will be seen that the invention is simple in construction and easy of control, and that any desired force for the purpose of checking or arresting the motion of a driven shaft or part may be applied according to the amount of pressure exerted by the fluid-pressure medium admitted to the pressure-cylinder.

The invention is not to be understood as being limited to the construction herein shown and described, as the details of the invention may be varied widely without departing from the principle or essence thereof. Also other means than fluid-pressure might be employed for forcing the disks or rings into frictional contact with each other when the brake is to be set.

Having thus described our invention, we claim and desired to secure by Letters Patent:

1. The combination with a stationary casing and a driven part or shaft, of a multiple-disk brake comprising a series of disks or rings a portion of which are connected with said driven part or shaft, to rotate therewith, and a portion of which are engaged with said casing so as to be restrained from rotation, combined with a pressure-cylinder attached to said casing, and a piston in said cylinder for forcing the said disks or rings into frictional contact with each other when a braking force is to be applied.

2. The combination with a stationary part or casing and a driven part or shaft, of a multiple-disk brake comprising a series of disks or rings a portion of which are connected with said driven part or shaft, to rotate therewith, and a portion of which are engaged with said stationary part or casing, so as to be restrained from rotation, combined with a pressure-cylinder attached to said casing and having a chamber opening into the casing-chamber, a piston in the chamber of said cylinder for forcing the said disks or rings into frictional contact with each other when a braking force is to be applied, and means for relieving the gripping frictional pressure of said rings against each other when the brake is to be let off.

3. The combination with a stationary casing and a driven part or shaft, of a multiple-disk brake comprising a series of disks or rings a portion of which are connected with said driven part or shaft, to rotate therewith, and a portion of which are connected with said stationary casing so as to be restrained from rotation, combined with means for forcing the said disks or rings into frictional contact with each other when a braking force is to be applied, and means for relieving the gripping frictional pressure of said rings against each other when the brake is to be let off, said casing inclosing all of said disks or rings and being adapted to contain a lubricant so that the said disks or rings comprising the brake device may run in oil.

4. The combination with a stationary casing and a driven part or shaft, of a multiple-disk brake comprising a series of disks or rings a portion of which are connected with said driven part or shaft, to rotate therewith, and a portion of which are connected with said casing so as to be restrained from rotation, both sets of disks or rings being inclosed by said casing so that they may run in oil, fluid-pressure means for forcing the said disks or rings into frictional contact with each other when the braking force is to be applied, and means for relieving the frictional pressure of said rings against each other when the brake is to be let off.

5. A multiple-disk vehicle-brake comprising a series of frictional disks or rings a portion of which rotate with a driven part and a portion of which, alternating with the movable disks or rings, are restrained from rotation by engagement with a stationary part, means for normally holding said disks or rings out of gripping frictional contact with each other, a pressure-cylinder, and a piston in said cylinder for forcing said disks or rings into frictional contact with each other when a braking force is to be applied.

6. A multiple-disk vehicle-brake comprising a series of friction disks or rings a portion of which rotate with a driven part, and a portion of which, alternating with the movable disks or rings, are restrained from rotation, springs for normally holding said disks or rings out of gripping frictional contact with each other, a pressure-cylinder, a piston in said cylinder for forcing said disks or rings into frictional contact with each other when a braking force is to be applied, and a stationary casing engaged by the said restrained portion of said disks or rings, said casing inclosing all of said disks or rings and to which casing said pressure-cylinder is attached so as to form an oil-chamber for the said disks or rings and piston.

7. A multiple-disk vehicle-brake comprising a series of friction disks or rings, one or more of which rotate with a driven part, and one or more of which, alternating with the movable disks or rings, are restrained from rotation by engagement with a fixed or stationary part, springs for relieving the frictional pressure of said disks or rings against each other, a casing inclosing said disks or rings and suitable for holding a lubricant for the same, and means for forcing said disks or rings into frictional contact with each other when a braking force is to be applied.

8. A multiple-disk vehicle-brake, suitable for use with automobiles, comprising the combination with the casing 14, provided with ears or lugs 24 for attachment to a suitable part of a vehicle-frame, of a rotating part or shaft extending within said casing, friction disks or rings one portion of which are engaged with said rotating part, so as to move therewith and the other portion of which are engaged with said casing so as to be restrained from rotation, springs for relieving the frictional pressure of said disks or rings against each other, a pressure cylinder attached to said casing, and a piston in said cylinder for forcing said disks or rings into frictional engagement with each other when a braking force is to be applied.

9. A multiple-disk vehicle-brake, suitable for use with automobiles, comprising the combination with the casing 14 provided with ears or lugs 24 for attachment to a suitable part of a vehicle-frame, of a rotating part or shaft extending within said casing, friction disks or rings one portion of which are engaged with said rotating part so as to move therewith, and the other portion of which are engaged with said casing so as to be restrained from rotation, springs for relieving the frictional pressure of said disks or rings against each other, and a piston, operated by fluid-pressure, for forcing said disks or rings into gripping frictional engagement with each other when a braking force is to be applied.

10. A multiple-disk vehicle-brake comprising the combination with a fixed or stationary part, and a driven or rotary part, of a series of friction disks or rings, one or more of which rotate with said driven or rotary part, and one or more of which, alternating with the rotary disks or rings, are restrained from rotation by engagement with said fixed or stationary part, springs for relieving the frictional pressure of said disks or rings against each other, and means for forcing said disks or rings into frictional contact with each other when a braking force is to be applied.

11. A multiple-disk vehicle-brake, comprising a stationary element connected with the frame of a vehicle, a rotary driven element, a series of disks or rings one or more of which are connected with said driven element, to rotate therewith, and one or more of which, alternating with the rotary disks or rings, engage said stationary element to be restrained from rotation thereby, means for forcing said disks or rings into frictional engagement with each other when a braking force is to be applied, and springs for relieving the pressure of said disks or rings against each other when their frictional engagement is to be relaxed.

In testimony whereof we affix our signatures in presence of two witnesses.

THOMAS LEGGETT STURTEVANT.
THOMAS JOSEPH STURTEVANT.

Witnesses:
W. H. ELLIS,
L. H. STURTEVANT.